(12) United States Patent
Hunt et al.

(10) Patent No.: US 8,177,974 B2
(45) Date of Patent: *May 15, 2012

(54) DISPOSABLE TANGENTIAL FLOW FILTRATION DEVICE HOLDER

(75) Inventors: Stephen G. Hunt, North Billerica, MA (US); Boris Pesakovich, Brookline, MA (US)

(73) Assignee: EMD Millipore Corporation, Billerica, MA (US)

( * ) Notice: Subject to any disclaimer, the term of this patent is extended or adjusted under 35 U.S.C. 154(b) by 199 days.

This patent is subject to a terminal disclaimer.

(21) Appl. No.: 11/404,287

(22) Filed: Apr. 14, 2006

(65) Prior Publication Data

US 2007/0241048 A1 Oct. 18, 2007

(51) Int. Cl.
*B01D 25/00* (2006.01)
*B01D 29/01* (2006.01)
*B01D 63/08* (2006.01)

(52) U.S. Cl. ........... 210/321.6; 210/321.75; 210/321.84; 210/224; 210/229; 210/455

(58) Field of Classification Search .................. None
See application file for complete search history.

(56) References Cited

U.S. PATENT DOCUMENTS

| | | | |
|---|---|---|---|
| 3,085,970 A | | 4/1963 | Davis |
| 3,520,803 A | * | 7/1970 | Iaconelli .................. 210/640 |
| 4,261,834 A | | 4/1981 | De Winter .................. 210/651 |
| 4,556,489 A | * | 12/1985 | Diettrich et al. ......... 210/321.77 |
| 4,732,675 A | * | 3/1988 | Badolato et al. .............. 210/314 |
| 4,849,102 A | | 7/1989 | Latour et al. |
| 4,867,876 A | | 9/1989 | Kopf .............................. 210/228 |
| 5,034,124 A | | 7/1991 | Kopf .............................. 210/231 |
| 5,049,268 A | | 9/1991 | Kopf |
| 5,096,582 A | | 3/1992 | Lombardi et al. ......... 210/321.6 |
| 5,147,542 A | | 9/1992 | Proulx ..................... 210/321.75 |
| 5,176,828 A | | 1/1993 | Proulx .......................... 210/341 |
| 5,258,122 A | | 11/1993 | Ha et al. ........................ 210/637 |
| 5,342,517 A | | 8/1994 | Kopf .............................. 210/228 |
| 5,445,737 A | * | 8/1995 | Ondrick .................. 210/321.71 |
| 5,599,447 A | | 2/1997 | Pearl et al. ............... 210/321.75 |
| 5,868,930 A | * | 2/1999 | Kopf ........................ 210/321.75 |
| 7,094,346 B2 | | 8/2006 | Osenar et al. ............ 210/321.75 |

(Continued)

FOREIGN PATENT DOCUMENTS

CN 2064262 10/1990

(Continued)

OTHER PUBLICATIONS

Selection Guide System Data Sheet BP-1070; Filtration. Separation. Solution; Bio Pharmaceuticals.

(Continued)

*Primary Examiner* — Nam Nguyen
*Assistant Examiner* — Madeline Gonzalez
(74) *Attorney, Agent, or Firm* — Nields, Lemack & Frame, LLC

(57) ABSTRACT

Tangential flow filtration device is provided wherein liners are provided between the filtration element and the top and bottom holders or manifolds. The liners incorporate the flow channels and inlet and outlet ports that were previously present in the manifolds. The liners are made of an inexpensive material and therefore are disposable after a single use, making it more cost effective to dispose of them than to clean the conventional manifolds. In addition, the liners can be pre-sterilized.

6 Claims, 3 Drawing Sheets

U.S. PATENT DOCUMENTS

| | | | | |
|---|---|---|---|---|
| 7,306,727 | B2 * | 12/2007 | Perreault | 210/321.6 |
| 7,473,404 | B2 | 1/2009 | Chopard et al. | |
| 2006/0060518 | A1 * | 3/2006 | Perreault | 210/321.6 |
| 2007/0138082 | A1 | 6/2007 | Connors, Jr. et al. | |
| 2011/0127203 | A1 | 6/2011 | Morrissey et al. | |
| 2011/0174711 | A1 | 7/2011 | Morrissey et al. | |

FOREIGN PATENT DOCUMENTS

| | | |
|---|---|---|
| EP | 0 345 209 | 12/1989 |
| EP | 1 637 213 | 3/2006 |
| EP | 1 844 846 A2 | 10/2007 |
| JP | 55-5684 | 1/1980 |
| JP | 2000-510722 A | 8/2000 |
| JP | 2006-88152 | 4/2006 |
| JP | 2008-238167 A | 10/2008 |
| WO | 97/28889 A1 | 8/1997 |
| WO | 97/42410 A1 | 11/1997 |
| WO | 02/085511 | 10/2002 |
| WO | 2008/107652 A1 | 9/2008 |

OTHER PUBLICATIONS

Manufacturing Conjugate Vaccines by Ian Sellick; BioProcess International; Apr. 2004 p. 33.

European Search Report dated Jan. 12, 2006.
European Search Report dated Aug. 26, 2008.
Japanese communicated dated Oct. 21, 2008.
The European Search Report dated Aug. 19, 2009.
The European communication dated Aug. 26, 2009.
Chinese communication dated Oct. 30, 2009.
Japanese communication dated May 11, 2010 in co-pending foreign application (JP2007-103871).
Chinese communication dated Jun. 2, 2010 in co-pending foreign application (CN-200710128282.3).
European Communication dated Oct. 7, 2010 in a co-pending foreign application (EP10164404.5).
European Communication dated Dec. 20, 2010 in a co-pending foreign application (EP10171374.1).
Japanese Communication, with English translation, mailed Sep. 13, 2011 in co-pending Japanese patent application No. JP 2010-124907.
Japanese Communication, with English translation, mailed Oct. 25, 2011 in co-pending Japanese patent application No. JP 2010-175454.

* cited by examiner

DISPOSABLE TANGENTIAL FLOW FILTRATION DEVICE HOLDER

BACKGROUND OF THE INVENTION

Tangential Flow Filtration (TFF) is a separation process that uses membranes to separate components in a liquid solution or suspension on the basis of size or molecule weight differences. Applications include concentration, clarification, and desalting of proteins and other biomolecules such as nucleotides, antigens, and monoclonal antibodies; buffer exchange; process development; membrane selection studies; pre-chromatographic clarification to remove colloidal particles; depyrogenation of small molecules such as dextrose and antibiotics; harvesting, washing or clarification of cell cultures, lysates, colloidal suspensions and viral cultures; and sample preparation.

In TFF, the solution or suspension to be filtered is passed across the surface of the membrane in a cross-flow mode. The driving force for filtration is the transmembrane pressure, usually created with a peristaltic pump. The velocity at which the filtrate is passed across the membrane surface also controls the filtration rate and helps prevent clogging of the membrane. Because TFF recirculates retentate across the membrane surface, membrane fouling is minimized, a high filtration rate is maintained, and product recovery is enhanced.

Conventional TFF devices are formed of a plurality of elements, including a pump, a feed solution reservoir, a filtration module and conduits for connecting these elements. In use, the feed solution is directed from the feed solution reservoir to the filtration module while the retentate from the filtration module is recirculated from the filtration module to the feed solution reservoir until the desired volume of retentate is obtained. The membrane is sandwiched between top and bottom manifolds or holders, which serve to provide accurate mechanical constraint against the internal hydraulic pressure of the device, and also serve to distribute the filtration stream across the multiple flow paths within the device. These manifolds or holders are typically made of stainless steel and must be cleaned and validated prior to each use, particularly in biopharmaceutical and other sanitary applications. This is an expensive and time-consuming process.

It would be desirable to provide a filtration device that eliminates the need for the aforementioned cleaning and validation steps when replacing the filtration medium.

SUMMARY OF THE INVENTION

In accordance with the present teachings, a tangential flow filtration device is provided wherein liners are provided between the filtration element and the top and bottom holders or manifolds. The liners incorporate the flow channels and inlet and outlet ports that were previously present in the manifolds. The liners are made of an inexpensive material and therefore are disposable after a single use, making it more cost effective to dispose of them than to clean the conventional manifolds. In addition, the liners can be pre-sterilized. In order to provide sufficient strength and rigidity under operating conditions, the liners have a grid pattern of ribs that abut the holder plates to help prevent the liners from torquing under clamping force.

DETAILED DESCRIPTION OF THE INVENTION

Figure 1:
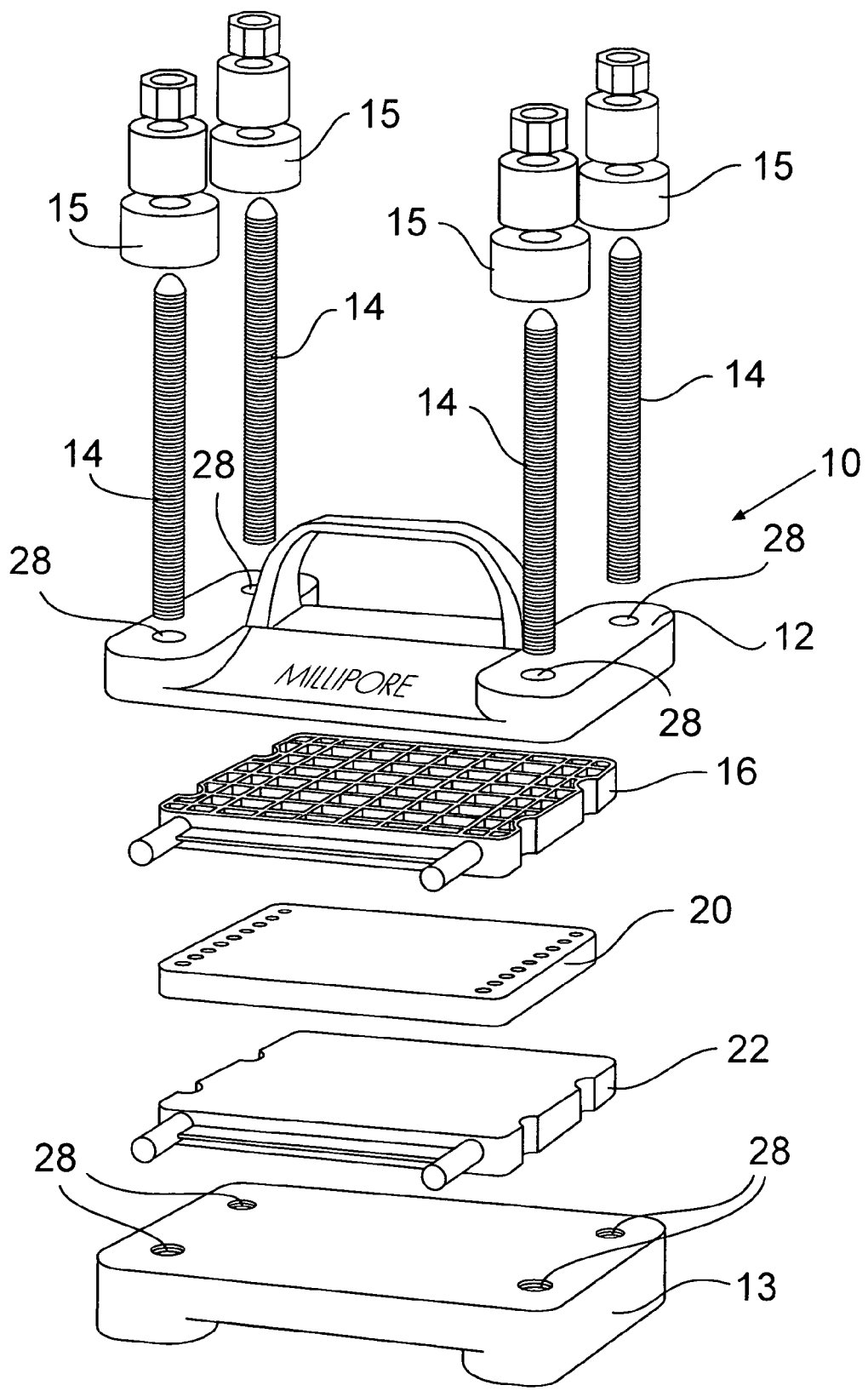
FIG. 1 is an exploded view of the filtration device in accordance with the present invention.

Turning first to FIG. 1, there is shown an exploded view of a filtration device 10 in accordance with the instant teachings. The device 10 includes a top holder plate 12 and a spaced bottom holder plate 13. The holder plates 12, 13 are preferably made of stainless steel and are sufficiently rigid and durable to provide accurate and effective mechanical constraint of the assembly against internal hydraulic operating pressures, such as 50-60 psi. Apertures 28 are provided in the holder plates 12, 13 and in each layer of the assembly to accommodate tie rods or threaded pins or bolts 14 or other clamping device to secure the assembly together. Spacers 15 are provided, and can be spring-loaded. No filtration stream passageways are present in the holder plates 12, 13.

Positioned beneath holder plate 12 in the assembled state is disposable liner 16. The liner 16 is preferably made of inexpensive material, suitable for the application, that is acceptable for pharmaceutical assays (and preferably is government approved). Suitable materials of construction include plastics, such as polystyrene, preferably polyolefins, such as polypropylene, polyethylene, copolymers and mixtures thereof. Polysulfone is particularly preferred in view of its strength and rigidity. The liner 16 is preferably molded with passageways and openings. Alternatively, and less preferred, it may be formed by milling, drilling and other such methods.

Figure 2:
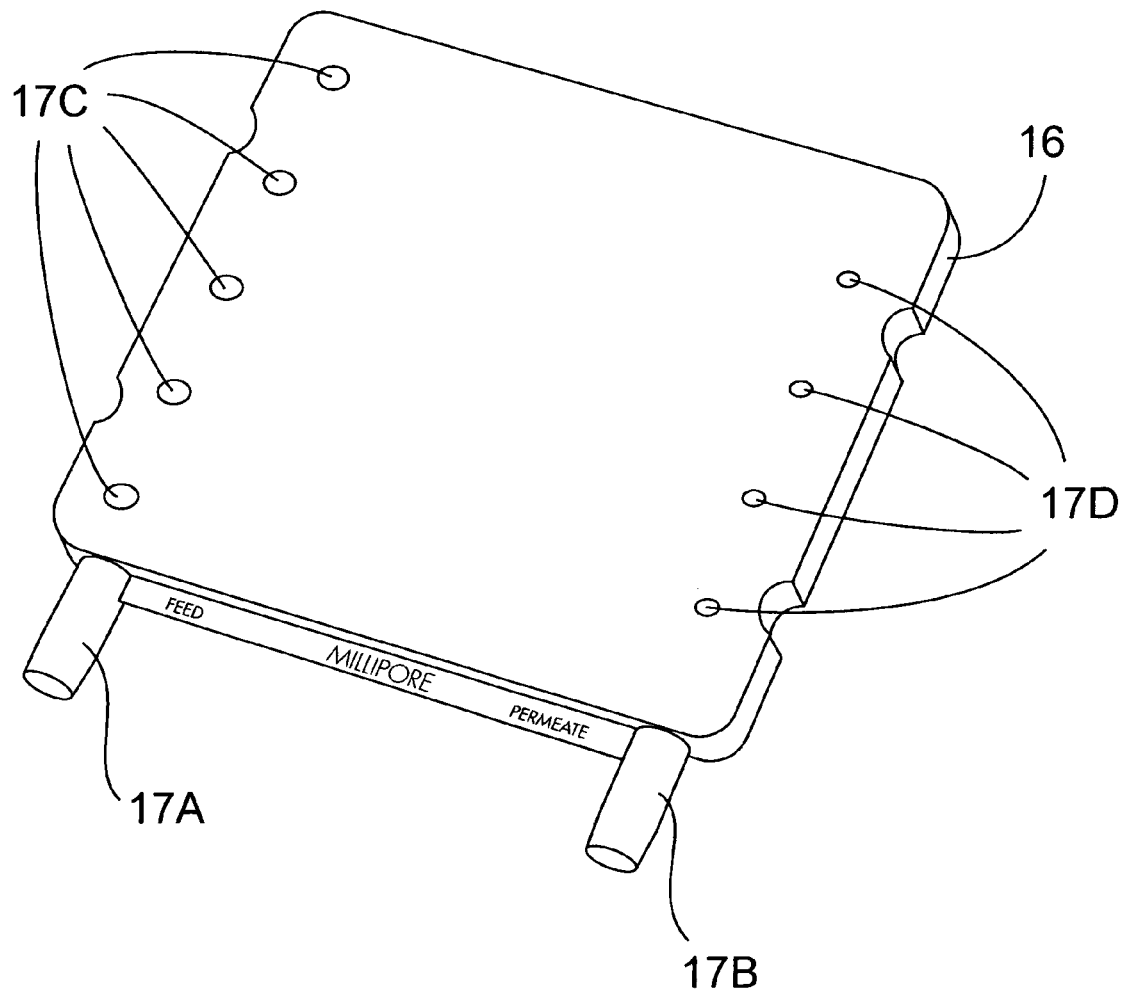
FIG. 2 is a top perspective view of a liner in accordance with the present invention.

As best seen in FIG. 2, the liner 16 includes a first port 17A, five sub-ports 17C a second port 17B and four sub-ports 17D. Port 17A is for introduction of feed or removal of retentate depending on its orientation within the assembly, with port 17B for removal of permeate, while preventing admixture of the filtrate with the retentate or feed, as is conventional. Port 17A is connected to the five sub-ports 17C in a manifold arrangement. Port 17B is connected to the four sub-ports 17D in a similar manner. The ports 17A and 17B may be located on opposite sides of the liner in order to provide adequate spacing and avoid interferences with other components. However, in the application shown, where spacing is sufficient or no interference occurs, they may be located on the same side. Each port 17A, 17B is in fluid communication with flow paths or passageways that communicate with respective apertures to accommodate flow of feed, retentate or permeate as is conventional, thereby defining multiple flow paths for the filtration stream within the device.

The passageways are preferably tapered, narrowing as they proceed away from their respective port, to normalize pressure at each of the sub-ports 17C and 17D.

Turning back to FIG. 1, there is shown positioned below liner 16 a filtration element 20. The filtration element 20 can be a single membrane, and is preferably a plurality of stacked membranes, such as stacked ultrafiltration or microfiltration membranes, most preferably provided in the form of a cassette. Although a single cassette of membranes is shown, those skilled in the art will appreciate that multiple cassettes can be used. Suitable cassettes are sold under the name PELLICON® and are commercially available from Millipore Corporation.

Positioned below the filter element 20 is a second liner 22. Preferably the second liner 22 is identical in construction to the first liner 16, but is when the device is in the assembled state, the liner 22 is inverted relative to the position of the first liner 16, as shown. This allows Port 17A to communicate with the feed ports of the device in its normal orientation, while communicating with the retentate ports while in the inverted position. Port 17B of the liner communicates with the permeate ports in both orientations.

Figure 3:
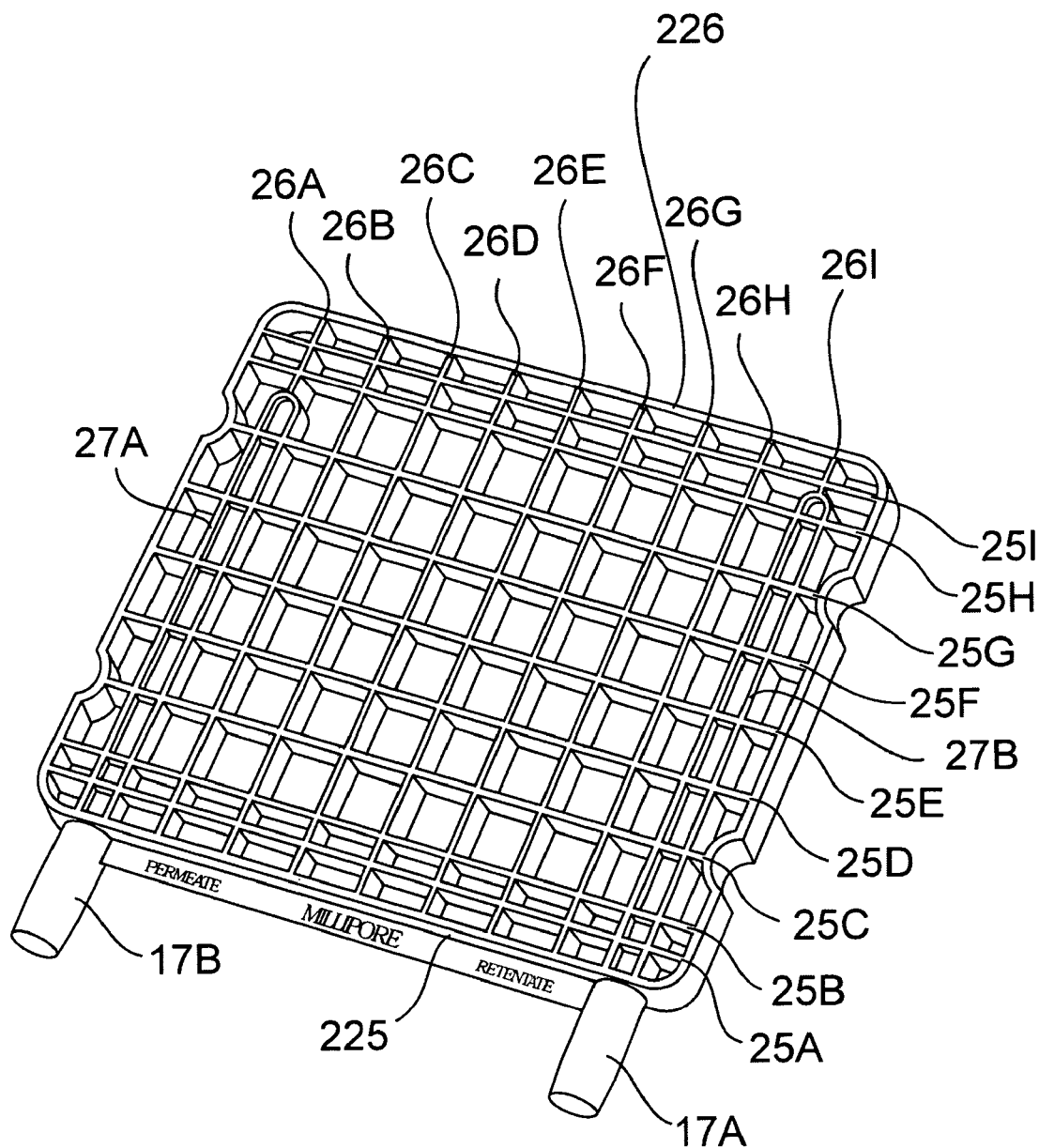
FIG. 3 is bottom perspective view of a liner in accordance with the present invention.

Preferably one side of the liners 16, 20 includes a plurality of inter-engaging ribs, as best seen in FIG. 3. The ribs provide added rigidity to the liners, and can be formed in the molding process. The ribs are positioned on the side of the liner that contacts the holder plate. The ribs extend from one side of the liner to the other, except where interrupted by a port. In the rib configuration shown, a grid is formed by a plurality of longitudinal and latitudinal ribs, with nine latitudinal ribs 25A-25I and nine longitudinal ribs 25A-26I. The latitudinal ribs are preferably parallel with one another, and the longitudinal ribs are preferably parallel with one another and perpendicular to the latitudinal ribs. The latitudinal ribs 25B-25H are preferably equally spaced, whereas the respective spaces between latitudinal rib 25A and 25B and 25A and the sidewall 225 of the liner are smaller, as are the spaces between ribs 25H and 25I and rib 25I and the opposite sidewall 226 of the liner. Clustering the ribs more closely together at the sidewalls provides additional strength to the liner. Longitudinal ribs 25A-26I are all equally spaced, with the spacing preferably the same or substantially the same as that of latitudinal ribs 25B-25H, so that the grid defined between ribs 25B-25H and ribs 26A-26I includes a plurality of squares, the grid formed between ribs 25H, sidewall 226, and ribs 26A-26I includes a plurality of rectangles, and the grid formed between ribs 25B and sidewall 225 and ribs 26A-26I includes a plurality of rectangles. A U-shaped rib 27A is formed around the permeate port 17B, as is U-shaped rib 27B around retentate port 17A.

The intricate rib configuration shown provides strength and rigidity to the liner. When assembled, there is significant clamping force applied to the filter element 20 and the liner, with sealing taking place between the smooth side of the liner and the filter element 20. Without the rib configuration, the liner would not remain flat, and therefore would not seal properly to the filter element 20. The ribs make it possible to effectively assemble the liners in the filtration device of the invention, in sealing engagement upon the application of pressure, without the necessity of having corresponding grooves in the holder plates to mate with the ribs. Accordingly, the respective surfaces of the holder plates that abut the grids of the liners are preferably flat, and need not be specially designed to fit the liners.

What is claimed is:

1. Filtration apparatus, comprising: a top plate; a bottom plate spaced from said top plate; a filtration member positioned between said top plate and said bottom plate; a first disposable plastic liner positioned between said top plate and said filtration member, said first liner having a fluid inlet, a fluid outlet, a plurality of fluid inlet apertures, and a pattern of ribs on one side thereof facing said top plate; a second disposable plastic liner positioned between said bottom plate and said filtration member, said second liner having a fluid inlet, a fluid outlet, a plurality of fluid outlet apertures and a pattern of ribs on one side thereof facing said bottom plate; wherein said top and bottom plates are devoid of fluid flow paths and each has a substantially flat surface that mates with said plurality of ribs on a respective liner, said substantially flat surface being grooveless, wherein said respective patterns of ribs on said first and second liners define a grid pattern, each said grid pattern retaining each liner in a flat configuration when mated with the respective top and bottom plates and subjected to pressure.

2. The filtration apparatus of claim 1, wherein said plurality of ribs on each respective liner are inter-engaging.

3. The filtration apparatus of claim 1, wherein said top and bottom plates comprise stainless steel.

4. The filtration apparatus of claim 1, wherein each said liner comprises polysulfone.

5. The filtration apparatus of claim 1, wherein said plurality of ribs on each of said first and second disposable liners comprises a plurality of parallel latitudinal ribs and a plurality of parallel longitudinal ribs perpendicular to said plurality of latitudinal ribs.

6. The filtration apparatus of claim 5, wherein said plurality of longitudinal ribs are equally spaced.

* * * * *